United States Patent
Czaplewski-Campbell et al.

(10) Patent No.: US 11,028,294 B2
(45) Date of Patent: Jun. 8, 2021

(54) ACRYLATE-CYANOACRYLATE MONOMERS

(71) Applicant: International Business Machines Corporation, Armonk, NY (US)

(72) Inventors: Sarah K. Czaplewski-Campbell, Rochester, MN (US); Joseph Kuczynski, North Port, FL (US); Melissa K. Miller, Morrisville, NC (US); Rebecca Morones, Berthoud, CO (US)

(73) Assignee: International Business Machines Corporation Armonk, New York, Armonk, NY (US)

( * ) Notice: Subject to any disclaimer, the term of this patent is extended or adjusted under 35 U.S.C. 154(b) by 257 days.

(21) Appl. No.: 16/100,612

(22) Filed: Aug. 10, 2018

(65) Prior Publication Data

US 2020/0048513 A1    Feb. 13, 2020

(51) Int. Cl.
  *C09J 133/14*  (2006.01)
  *C09J 133/08*  (2006.01)
  *C08K 5/053*   (2006.01)

(52) U.S. Cl.
  CPC ........... *C09J 133/14* (2013.01); *C09J 133/08* (2013.01); *C08K 5/053* (2013.01); *C09J 2301/416* (2020.08)

(58) Field of Classification Search
  CPC ..................................................... C09J 133/14
  See application file for complete search history.

(56) References Cited

U.S. PATENT DOCUMENTS

| | | | | |
|---|---|---|---|---|
| 2,816,093 | A * | 12/1957 | Coover, Jr. | ........... C08F 222/00 526/298 |
| 4,533,422 | A | 8/1985 | Litke | |
| 5,703,267 | A | 12/1997 | Takahashi et al. | |
| 5,922,783 | A | 7/1999 | Wojciak | |
| 8,287,687 | B1 * | 10/2012 | Schueneman | ............. B32B 7/12 156/331.4 |
| 2013/0041062 | A1 | 2/2013 | Maeda et al. | |
| 2014/0247997 | A1 | 9/2014 | Nishiyama et al. | |
| 2014/0329980 | A1 | 11/2014 | Malofsky et al. | |
| 2016/0193119 | A1 | 7/2016 | Sun | |

FOREIGN PATENT DOCUMENTS

| | | |
|---|---|---|
| EP | 2154214 A2 | 2/2010 |
| WO | WO 2001/018068 A1 | 3/2001 |
| WO | WO 2017/021785 A1 | 2/2017 |
| WO | WO 2017/077089 A1 | 5/2017 |

OTHER PUBLICATIONS

Loctite, Loctite® 4311™ Technical Data Sheet, Jan. 2018, 4 pages. Henkel (online), http://tds.us.henkel.com/NA/UT/HNAUTTDS.nsf/web/AD6BF1584FC7CD20852576E9004870E3/$File/4311-EN.pdf.

Loctite, Loctite 4205, Technical Data Sheet, Mar. 2010, 3 pages, Henkel (online), http://tds.us.henkel.com/NA/UT/HNAUTTDS.nsf/web/F02889E3F559B2BB882571870000D779/$File/4205-EN.pdf.

* cited by examiner

*Primary Examiner* — Golam M Shameem
(74) *Attorney, Agent, or Firm* — Roy R. Salvagio; Jordan A. Lewis

(57) ABSTRACT

An adhesive composition includes a photoinitiator and an acrylate-cyanoacrylate monomer. The acrylate-cyanoacrylate monomer includes at least one acrylate functional group to enable photo-curing of the adhesive composition and at least one cyanoacrylate functional group to enable latent curing of the adhesive composition.

4 Claims, 13 Drawing Sheets

ACRYLATE-CYANOACRYLATE MONOMERS

BACKGROUND

Cyanoacrylate-based adhesives may be cured using ultraviolet (UV) light. Such cyanoacrylate-based adhesives may have a viscosity that is insufficient for satisfactory "gap filling" between components. As such, the viscosity of such cyanoacrylate-based adhesives may be increased via addition of a filler material (e.g., fumed silica), which may deleteriously affect a depth of cure of the adhesive.

SUMMARY

According to an embodiment, an adhesive composition is disclosed. The adhesive composition includes a photoinitiator and an acrylate-cyanoacrylate monomer. The acrylate-cyanoacrylate monomer includes at least one acrylate functional group to enable photo-curing of the adhesive composition and at least one cyanoacrylate functional group to enable latent curing of the adhesive composition.

According to another embodiment, a process of forming an acrylate-cyanoacrylate monomer is disclosed. The process includes forming a mixture that includes a polyol, acrylic acid, and 2-cyanoacrylic acid. The process includes initiating a transesterification reaction to form an acrylate-cyanoacrylate monomer having at least one acrylate functional group and at least one cyanoacrylate functional group.

According to yet another embodiment, a component assembly process is disclosed that includes applying an adhesive composition to a first component. The adhesive composition includes a photoinitiator and an acrylate-cyanoacrylate monomer having at least one acrylate functional group and at least one cyanoacrylate functional group. The at least one acrylate functional group enables photo-curing of the adhesive composition, and the at least one cyanoacrylate functional group enables latent curing of the adhesive composition. The process also includes exposing the adhesive composition to actinic radiation to initiate the photo-curing for fixing the first component to a second component. The latent curing fills gaps between the first component and the second component.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes acrylate-cyanoacrylate monomers, processes for forming such monomers, and adhesive compositions that include such monomers. The acrylate-cyanoacrylate monomers of the present disclosure are multifunctional monomers that include both acrylate and cyanoacrylate functionalities. An acrylate functionality reacts rapidly under photolysis conditions in the presence of a suitable photoinitiator, while a cyanoacrylate functionality undergoes anionic polymerization in the presence of a weak base. Thus, the acrylate-cyanoacrylate monomers of the present disclosure incorporate both a rapid photo-curing capability and a latent/dark curing capability into a single multifunctional compound.

Additionally, the synthetic procedures described herein provide the ability to control viscosity at the monomer level, rather than relying on a filler material (e.g., fumed silica) which may deleteriously affect a depth of cure of an adhesive. Some cyanoacrylate-based adhesives (e.g., adhesives that utilize a 2-ethylcyanoacrylate monomer) have viscosities that are insufficient to adequately fill gaps between components during component assembly, requiring a multiple-step application process. An adhesive that incorporates an acrylate-cyanoacrylate monomer of the present disclosure may have a relatively high viscosity compared to such cyanoacrylate-based adhesives. The adhesive viscosity may be "tailored" at the monomer level during monomer synthesis by controlling reactant stoichiometry to provide sufficient "gap filling" capabilities to enable a single-step application process.

Figure 1:
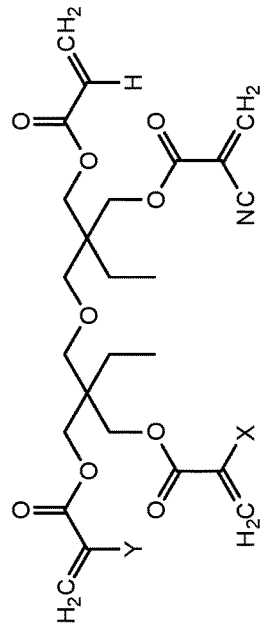
FIG. 1 is a diagram depicting various examples of acrylate-cyanoacrylate monomers of the present disclosure.
Figure 1:
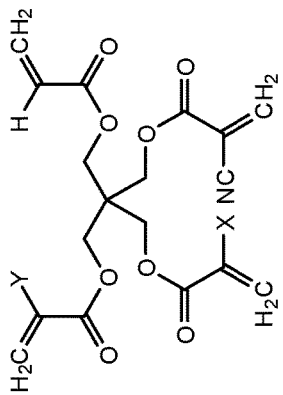
Figure 1:
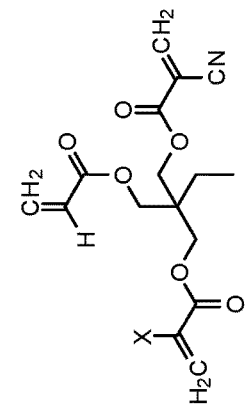

Referring to FIG. 1, a diagram 100 illustrates various examples of acrylate-cyanoacrylate monomers of the present disclosure. FIG. 1 depicts generic structural formulae for a first acrylate-cyanoacrylate monomer 102, a second acrylate-cyanoacrylate monomer 104, and a third acrylate-cyanoacrylate monomer 106. The first acrylate-cyanoacrylate monomer 102 corresponds to a trimethylolpropane (TMP) derivative. The second acrylate-cyanoacrylate monomer 104 corresponds to a di(trimethylolpropane) (di-TMP) derivative. The third acrylate-cyanoacrylate monomer 106 corresponds to a pentaerythritol (PE) derivative.

Each of the acrylate-cyanoacrylate monomers 102-106 depicted in FIG. 1 is a multifunctional monomer including both acrylate and cyanoacrylate functionalities. The acrylate functionality reacts rapidly under photolysis conditions in the presence of a suitable photoinitiator, while the cyanoacrylate functionality undergoes anionic polymerization in the presence of a weak base. By incorporating both functionalities, the acrylate-cyanoacrylate monomers 102-106 enable both a rapid cure and a latent dark cure. Additionally, an adhesive composition that includes one or more of the acrylate-cyanoacrylate monomers 102-106 depicted in FIG.

1 may have an increased viscosity compared to a cyanoacrylate-based adhesive that utilizes a 2-ethylcyanoacrylate monomer, providing improved gap filling properties.

The first acrylate-cyanoacrylate monomer 102 depicted in FIG. 1 represents a first example of a multifunctional acrylate-cyanoacrylate compound that may be derived from a first polyol, TMP. Trimethylolpropane triacrylate (TMPTA) is an example of a tri-functional acrylic monomer that cures rapidly upon exposure to actinic radiation. TMPTA is synthesized via the reaction of acrylic acid with TMP. In contrast to TMPTA with three acrylate functionalities, the first acrylate-cyanoacrylate monomer 102 is a TMP derivative having both acrylate and cyanoacrylate functionalities. The TMP derivative has the generic structural formula:

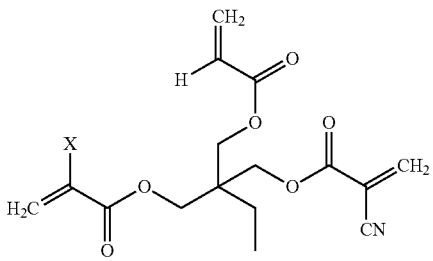

In the generic structural formula above, the letter X represents either H or CN. As illustrated and described further herein with respect to FIGS. 2A and 2B, a mixture of acrylic acid and 2-cyanoacrylic acid may be used to form the TMP derivative. Depending on the reaction stoichiometry, the TMP derivative may have one acrylate group and two cyanoacrylate groups (see FIG. 2A) or two acrylate groups and one cyanoacrylate group (see FIG. 2B). Different numbers of acrylate/cyanoacrylate groups in the TMP derivative may provide different levels of photo-curing/latent curing functionality.

According to some embodiments of the present disclosure, the first acrylate-cyanoacrylate monomer 102 and a photoinitiator may form an adhesive composition. The acrylate functionality enables rapid photo-curing, while the cyanoacrylate functionality enables latent dark curing. TMPTA has a viscosity of 122 cP compared to a viscosity of 30-50 cP for 2-ethylcyanoacrylate. As such, the first acrylate-cyanoacrylate monomer 102 is expected to have an increased viscosity compared to a 2-ethylcyanoacrylate monomer. Accordingly, an adhesive composition that includes the first acrylate-cyanoacrylate monomer 102 may provide improved gap filling capabilities compared to an adhesive resin that includes a 2-ethylcyanoacrylate monomer.

The second acrylate-cyanoacrylate monomer 104 depicted in FIG. 1 represents a second example of a multifunctional acrylate-cyanoacrylate compound that may be derived from a second polyol, di-TMP. Di(trimethylolpropane) tetraacrylate is an example of a tetra-functional acrylic monomer that cures rapidly upon exposure to actinic radiation. Di(trimethylolpropane) tetraacrylate is synthesized via the reaction of acrylic acid with di(trimethylolpropane). In contrast to di(trimethylolpropane) tetraacrylate with four acrylate functionalities, the second acrylate-cyanoacrylate monomer 104 corresponds to a di-TMP derivative having both acrylate and cyanoacrylate functionalities. The di-TMP derivative has the generic structural formula:

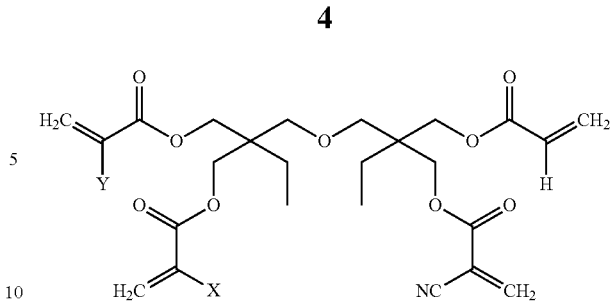

In the generic structural formula above, the letter X represents either H or CN, and the letter Y represents either H or CN. As illustrated and described further herein with respect to FIGS. 3A to 3C, a mixture of acrylic acid and 2-cyanoacrylic acid may be used to form the di-TMP derivative. Depending on the reaction stoichiometry, the di-TMP derivative may have one acrylate group and three cyanoacrylate groups (see FIG. 3A), two acrylate groups and two cyanoacrylate groups (see FIG. 3B), or three acrylate groups and one cyanoacrylate groups (see FIG. 3C). Different numbers of acrylate/cyanoacrylate groups in the di-TMP derivative may provide different levels of photo-curing/latent curing functionality.

According to some embodiments of the present disclosure, the second acrylate-cyanoacrylate monomer 104 and a photoinitiator may form an adhesive composition. The acrylate functionality enables rapid photo-curing, while the cyanoacrylate functionality enables latent dark curing. Di-TMP has a viscosity in a range of 483-861 cP compared to a viscosity of 30-50 cP for 2-ethylcyanoacrylate. As such, the second acrylate-cyanoacrylate monomer 104 is expected to have an increased viscosity compared to a 2-ethylcyanoacrylate monomer. Accordingly, an adhesive composition that includes the second acrylate-cyanoacrylate monomer 104 may provide improved gap filling capabilities compared to an adhesive resin that includes a 2-ethylcyanoacrylate monomer.

The third acrylate-cyanoacrylate monomer 106 depicted in FIG. 1 represents a third example of a multifunctional acrylate-cyanoacrylate compound that may be derived from a third polyol, PE. Pentaerythritol tetraacrylate is an example of a tetra-functional acrylic monomer that cures rapidly upon exposure to actinic radiation. Pentaerythritol tetraacrylate is synthesized via the reaction of acrylic acid with PE. In contrast to pentaerythritol tetraacrylate with four acrylate functionalities, the third acrylate-cyanoacrylate monomer 106 corresponds to a PE derivative having both acrylate and cyanoacrylate functionalities. The PE derivative has the generic structural formula:

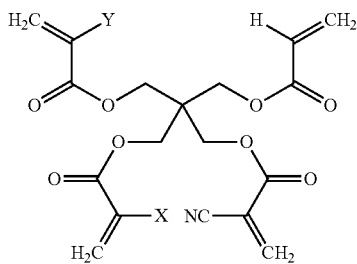

In the generic structural formula above, the letter X represents either H or CN, and the letter Y represents either H or CN. As illustrated and described further herein with respect to FIGS. 4A to 4C, a mixture of acrylic acid and 2-cyanoacrylic acid may be used to form the PE derivative. Depending on the reaction stoichiometry, the PE derivative may have one acrylate group and three cyanoacrylate groups (see FIG. 4A), two acrylate groups and two cyanoacrylate groups (see FIG. 4B), or three acrylate groups and one cyanoacrylate groups (see FIG. 4C). Different numbers of acrylate/cyanoacrylate groups in the PE derivative may provide different levels of photo-curing/latent curing functionality.

According to some embodiments of the present disclosure, the third acrylate-cyanoacrylate monomer 106 and a photoinitiator may form an adhesive composition. The acrylate functionality enables rapid photo-curing, while the cyanoacrylate functionality enables latent dark curing. PE tetraacrylate has a viscosity of 342 cP compared to a viscosity of 30-50 cP for 2-ethylcyanoacrylate. As such, the third acrylate-cyanoacrylate monomer 106 is expected to have an increased viscosity compared to 2-ethylcyanoacrylate. Accordingly, an adhesive composition that includes the third acrylate-cyanoacrylate monomer 106 may provide improved gap filling capabilities compared to an adhesive resin that includes a 2-ethylcyanoacrylate monomer.

Thus, FIG. 1 illustrates various examples of acrylate-cyanoacrylate monomers of the present disclosure. Each acrylate-cyanoacrylate monomer is a multifunctional monomer including both acrylate and cyanoacrylate functionalities. By incorporating both functionalities, the acrylate-cyanoacrylate monomers enable both a rapid cure (for fixing components together) and a latent dark cure (for filling gaps between components). Additionally, adhesive compositions including the acrylate-cyanoacrylate monomers may have an increased viscosity compared to a cyanoacrylate adhesive that utilizes a 2-ethylcyanoacrylate monomer, enabling better gap filling between components. As illustrated and further described herein with respect to FIGS. 2A-2B, 3A-3C, and 4A-4C, a mixture of acrylic acid and 2-cyanoacrylic acid may be reacted with hydroxyl groups of a polyol to form the acrylate and cyanoacrylate functionalities.

Figure 2A:
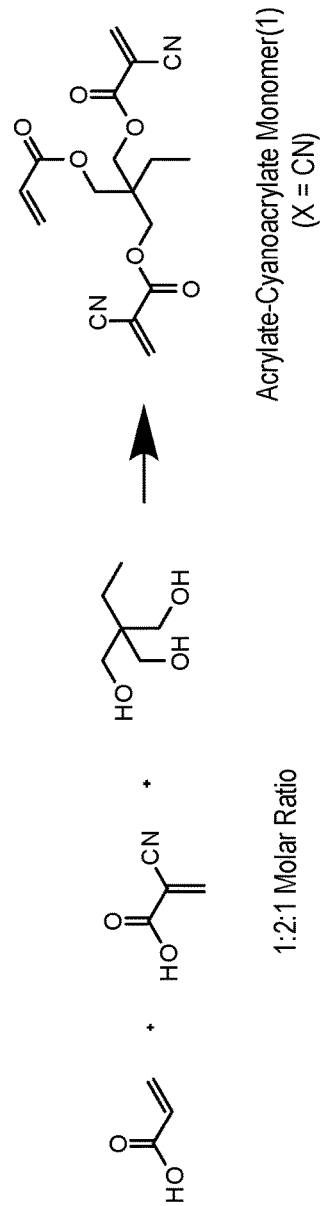
FIGS. 2A and 2B are chemical reaction diagrams illustrating processes for forming the first acrylate-cyanoacrylate monomer depicted in FIG. 1, according to a particular embodiment.
Figure 2B:
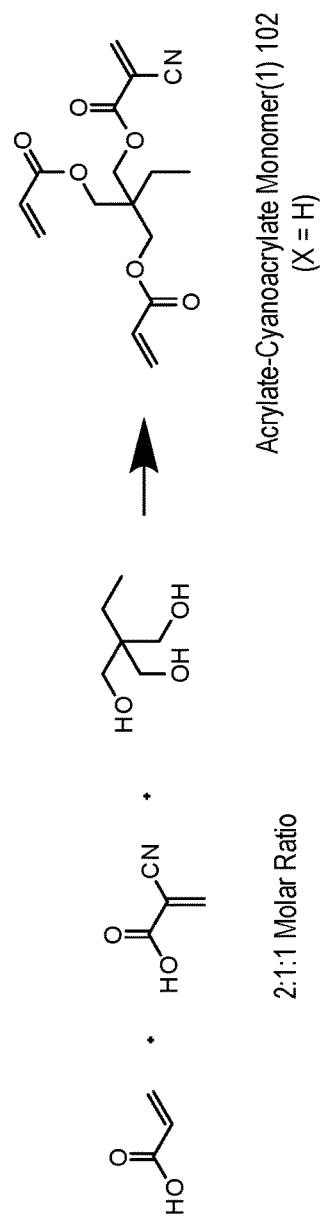

FIGS. 2A and 2B illustrate processes for forming the first acrylate-cyanoacrylate monomer 102 depicted in FIG. 1, according to a particular embodiment. A mixture of acrylic acid and 2-cyanoacrylic acid is utilized to form the acrylate and cyanoacrylate functionalities. Different reaction stoichiometries result in different levels of cyanoacrylate substitution of the hydroxyl groups of TMP.

Referring to FIG. 2A, a chemical reaction diagram 200 illustrates a process for forming the first acrylate-cyanoacrylate monomer 102 depicted in FIG. 1, according to one embodiment.

The chemical reaction diagram 200 shows a chemical reaction in which the reactants include a mixture of acrylic acid, 2-cyanoacrylic acid, and TMP, according to a first molar ratio of 1:2:1 (acrylic acid:2-cyanoacrylic acid:TMP). For the first molar ratio of reactants, a transesterification reaction results in a mixed acrylate-cyanoacrylate compound with two cyanoacrylate groups and one acrylate group, having the following structural formula:

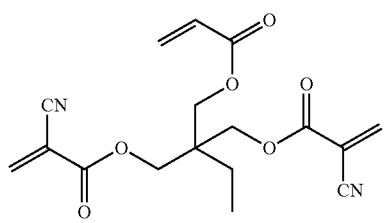 [SMILES: C=CC(=O)OCC(CC)(COC(=O)C(=C)C#N)COC(=O)C(=C)C#N]

As a prophetic example, reactants according to a molar ratio of 1:2:1 (acrylic acid:2-cyanoacrylic acid:TMP), a solvent (e.g., toluene), and a catalyst (e.g., p-toluenesulfonate) may be added to a four-necked flask and mixed, and a reaction may be conducted at a temperature of about 110° C. for about 2 hours under reflux dehydration. The mixture may be cooled to room temperature, the reaction liquid may be added dropwise to water, and the precipitated solid may be separated by filtration, washed and dried to yield the acrylate-cyanoacrylate TMP derivative depicted in FIG. 2A.

Referring to FIG. 2B, a chemical reaction diagram 210 illustrates a process for forming the first acrylate-cyanoacrylate monomer 102 depicted in FIG. 1, according to one embodiment.

The chemical reaction diagram 210 shows a chemical reaction in which the reactants include a mixture of acrylic acid, 2-cyanoacrylic acid, and trimethylolpropane, according to a second molar ratio of 2:1:1 (acrylic acid:2-cyanoacrylic acid:TMP). For the second molar ratio of reactants, a transesterification reaction results in a mixed acrylate-cyanoacrylate compound with two acrylate groups and one cyanoacrylate group, having the following structural formula:

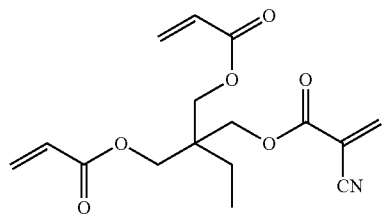 [SMILES: C=CC(=O)OCC(CC)(COC(=O)C=C)COC(=O)C(=C)C#N]

In a particular embodiment, the first acrylate-cyanoacrylate monomer 102 depicted in FIG. 2B having two acrylate groups and one cyanoacrylate group may be synthesized in a similar manner to that described with respect to FIG. 2A, modified to a molar ratio of 2:1:1 (acrylic acid:2-cyanoacrylic acid:TMP).

Thus, FIGS. 2A and 2B illustrate examples of processes for forming an acrylate-cyanoacrylate TMP derivative. A mixture of acrylic acid and 2-cyanoacrylic acid is utilized to form the acrylate and cyanoacrylate functionalities. Different reaction stoichiometries result in different levels of cyanoacrylate substitution of the hydroxyl groups of TMP.

Figure 3A:
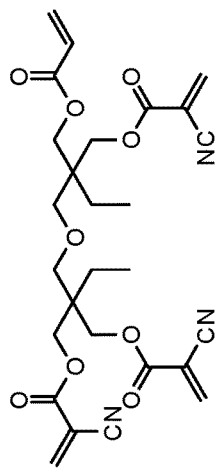
FIGS. 3A to 3C are chemical reaction diagrams illustrating processes for forming the second acrylate-cyanoacrylate monomer depicted in FIG. 1, according to a particular embodiment.
Figure 3A:
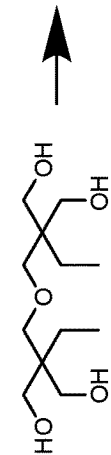
Figure 3A:
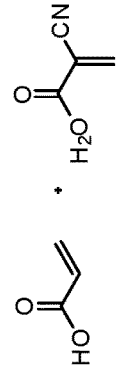
Figure 3B:
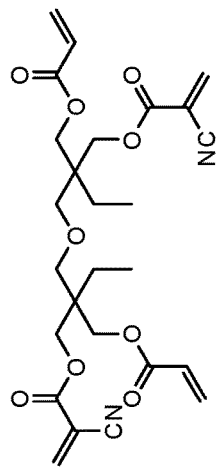
Figure 3B:
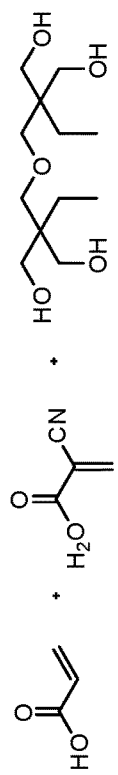
Figure 3C:
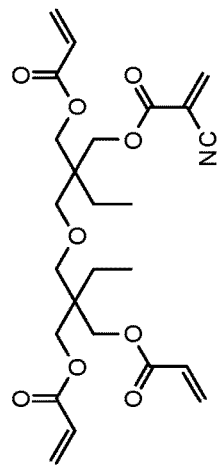
Figure 3C:
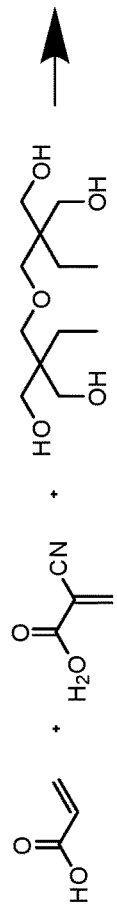

FIGS. 3A to 3C illustrate processes for forming the second acrylate-cyanoacrylate monomer 104 depicted in FIG. 1, according to a particular embodiment. A mixture of acrylic acid and 2-cyanoacrylic acid is utilized to form the acrylate and cyanoacrylate functionalities. Different reaction stoichiometries result in different levels of cyanoacrylate substitution of the hydroxyl groups of di-TMP.

Referring to FIG. 3A, a chemical reaction diagram 300 illustrates a process for forming the second acrylate-cyanoacrylate monomer 104 depicted in FIG. 1, according to one embodiment.

The chemical reaction diagram 300 shows a chemical reaction in which the reactants include a mixture of acrylic acid, 2-cyanoacrylic acid, and di-TMP, according to a first molar ratio of 1:3:1 (acrylic acid:2-cyanoacrylic acid:di-TMP). For the first molar ratio of reactants, a transesterification reaction results in a mixed acrylate-cyanoacrylate compound with three cyanoacrylate groups and one acrylate group, having the following structural formula:

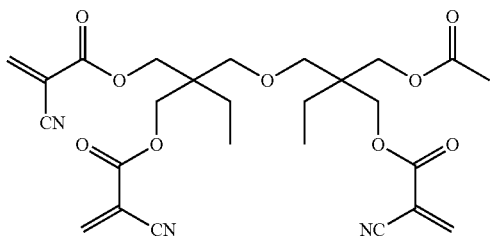 [SMILES: C=C(C#N)C(=O)OCC(CC)(COCC(CC)(COC(=O)C(=C)C#N)COC(=O)C(=C)C#N)COC(C)=O]

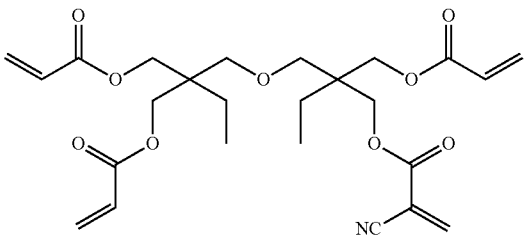

As a prophetic example, reactants according to a molar ratio of 1:3:1 (acrylic acid:2-cyanoacrylic acid:di-TMP), a solvent (e.g., toluene), and a catalyst (e.g., p-toluenesulfonate) may be added to a four-necked flask and mixed, and a reaction may be conducted at a temperature of about 110° C. for about 2 hours under reflux dehydration. The mixture may be cooled to room temperature, the reaction liquid may be added dropwise to water, and the precipitated solid may be separated by filtration, washed and dried to yield the acrylate-cyanoacrylate di-TMP derivative depicted in FIG. 3A.

Referring to FIG. 3B, a chemical reaction diagram 310 illustrates a process for forming the second acrylate-cyanoacrylate monomer 104 depicted in FIG. 1, according to one embodiment.

The chemical reaction diagram 310 shows a chemical reaction in which the reactants include a mixture of acrylic acid, 2-cyanoacrylic acid, and di-TMP, according to a second molar ratio of 2:2:1 (acrylic acid:2-cyanoacrylic acid:di-TMP). For the second molar ratio of reactants, a transesterification reaction results in a mixed acrylate-cyanoacrylate compound with two cyanoacrylate groups and two acrylate groups, having the following structural formula:

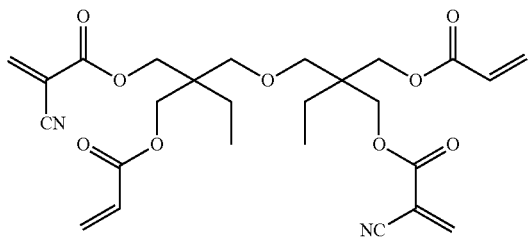 [SMILES: C=CC(=O)OCC(CC)(COCC(CC)(COC(=O)C=C)COC(=O)C(=C)C#N)COC(=O)C(=C)C#N]

In a particular embodiment, the second acrylate-cyanoacrylate monomer 104 depicted in FIG. 3B having two acrylate groups and two cyanoacrylate groups may be synthesized in a similar manner to that described with respect to FIG. 3A, modified to a molar ratio of 2:2:1 (acrylic acid:2-cyanoacrylic acid:di-TMP).

Referring to FIG. 3C, a chemical reaction diagram 320 illustrates a process for forming the second acrylate-cyanoacrylate monomer 104 depicted in FIG. 1, according to one embodiment.

The chemical reaction diagram 320 shows a chemical reaction in which the reactants include a mixture of acrylic acid, 2-cyanoacrylic acid, and di-TMP, according to a third molar ratio of 3:1:1 (acrylic acid:2-cyanoacrylic acid:di-TMP). For the third molar ratio of reactants, a transesterification reaction results in a mixed acrylate-cyanoacrylate compound with one cyanoacrylate group and three acrylate groups, having the following structural formula:

In a particular embodiment, the second acrylate-cyanoacrylate monomer 104 depicted in FIG. 3C having three acrylate groups and one cyanoacrylate group may be synthesized in a similar manner to that described with respect to FIG. 3A, modified to a molar ratio of 3:1:1 (acrylicacid:2-cyanoacrylicacid:di-TMP).

Thus, FIGS. 3A to 3C illustrate examples of processes for forming an acrylate-cyanoacrylate di-TMP derivative. A mixture of acrylic acid and 2-cyanoacrylic acid is utilized to form the acrylate and cyanoacrylate functionalities. Different reaction stoichiometries result in different levels of cyanoacrylate substitution of the hydroxyl groups of di-TMP.

Figure 4A:
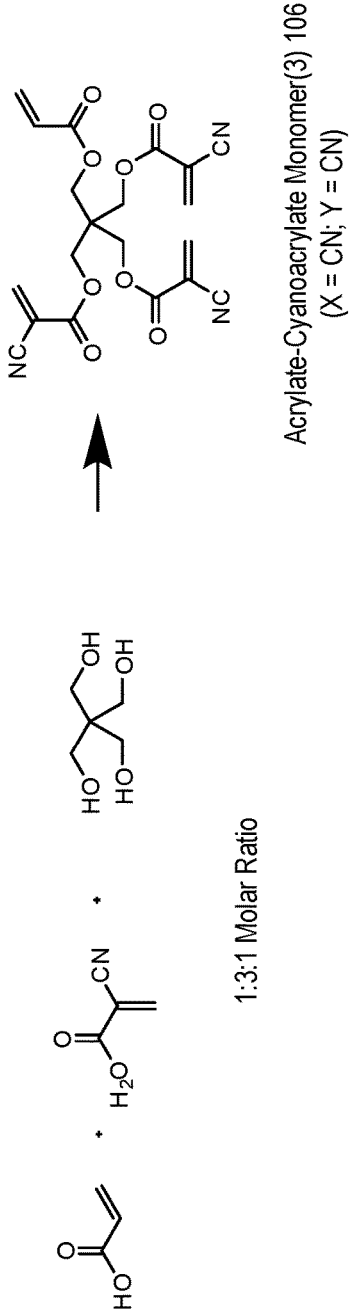
FIGS. 4A to 4C are chemical reaction diagrams illustrating processes for forming the third acrylate-cyanoacrylate monomer depicted in FIG. 1, according to a particular embodiment.
Figure 4B:
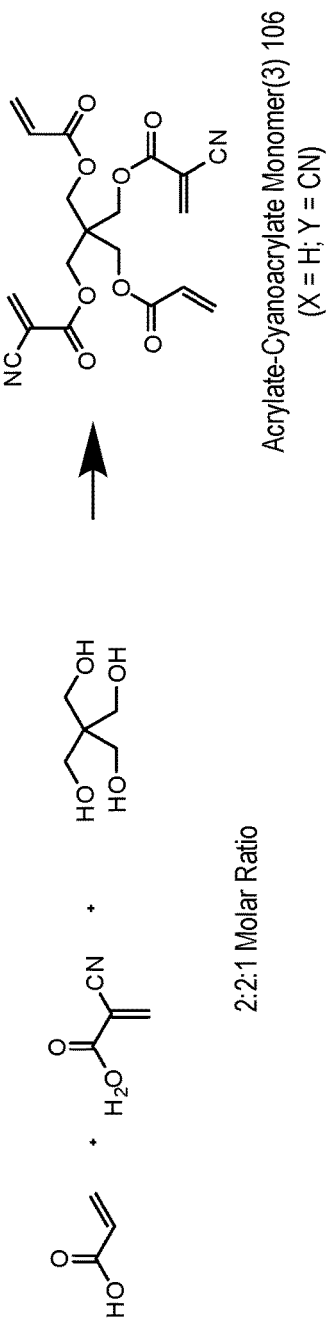
Figure 4C:
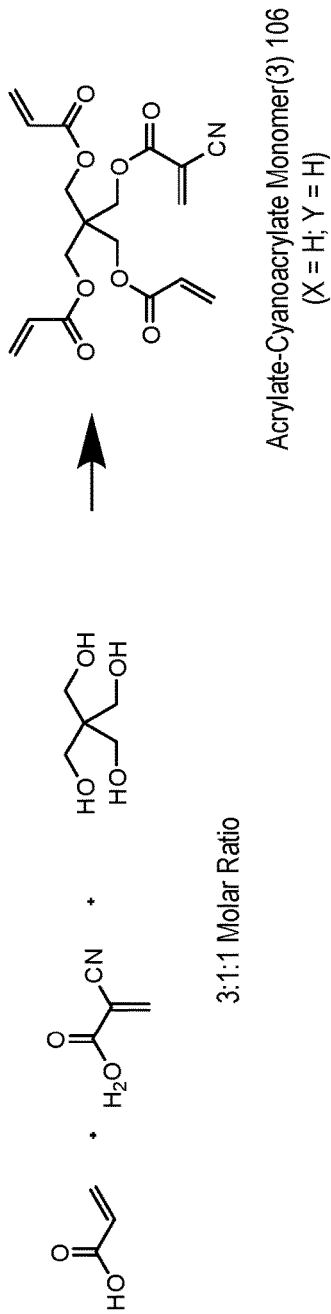

FIGS. 4A to 4C illustrate processes for forming the third acrylate-cyanoacrylate monomer 106 depicted in FIG. 1, according to a particular embodiment. A mixture of acrylic acid and 2-cyanoacrylic acid is utilized to form the acrylate and cyanoacrylate functionalities. Different reaction stoichiometries result in different levels of cyanoacrylate substitution of the hydroxyl groups of PE.

Referring to FIG. 4A, a chemical reaction diagram 400 illustrates a process for forming the third acrylate-cyanoacrylate monomer 106 depicted in FIG. 1, according to one embodiment.

The chemical reaction diagram 400 shows a chemical reaction in which the reactants include a mixture of acrylic acid, 2-cyanoacrylic acid, and pentaerythritol (PE), according to a first molar ratio of 1:3:1 (acrylic acid:2-cyanoacrylic acid:PE). For the first molar ratio of reactants, a transesterification reaction results in a mixed acrylate-cyanoacrylate compound with three cyanoacrylate groups and one acrylate group, having the following structural formula:

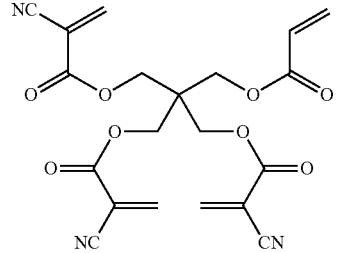 [SMILES: C=CC(=O)OCC(COC(=O)C(=C)C#N)(COC(=O)C(=C)C#N)COC(=O)C(=C)C#N]

As a prophetic example, reactants according to a molar ratio of 1:3:1 (acrylic acid:2-cyanoacrylic acid:PE), a solvent (e.g., toluene), and a catalyst (e.g., p-toluenesulfonate) may be added to a four-necked flask and mixed, and a reaction may be conducted at a temperature of about 110° C. for about 2 hours under reflux dehydration. The mixture may be cooled to room temperature, the reaction liquid may be added dropwise to water, and the precipitated solid may be separated by filtration, washed and dried to yield the acrylate-cyanoacrylate PE derivative depicted in FIG. 4A.

Referring to FIG. 4B, a chemical reaction diagram 410 illustrates a process for forming the third acrylate-cyanoacrylate monomer 106 depicted in FIG. 1, according to one embodiment.

The chemical reaction diagram 410 shows a chemical reaction in which the reactants include a mixture of acrylic acid, 2-cyanoacrylic acid, and PE, according to a second molar ratio of 2:2:1 (acrylic acid:2-cyanoacrylic acid:PE). For the second molar ratio of reactants, a transesterification reaction results in a mixed acrylate-cyanoacrylate compound with two cyanoacrylate groups and two acrylate groups, having the following structural formula:

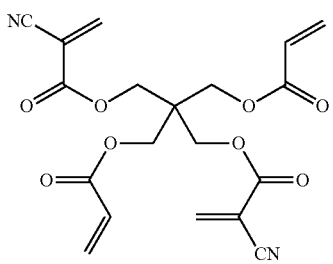 [SMILES: C=CC(=O)OCC(COC(=O)C=C)(COC(=O)C(=C)C#N)COC(=O)C(=C)C#N]

In a particular embodiment, the third acrylate-cyanoacrylate monomer 106 depicted in FIG. 4B having two acrylate groups and two cyanoacrylate groups may be synthesized in a similar manner to that described with respect to FIG. 4A, modified to a molar ratio of 2:2:1 (acrylic acid:2-cyanoacrylic acid:PE).

Referring to FIG. 4C, a chemical reaction diagram 420 illustrates a process for forming the third acrylate-cyanoacrylate monomer 106 depicted in FIG. 1, according to one embodiment.

The chemical reaction diagram 420 shows a chemical reaction in which the reactants include a mixture of acrylic acid, 2-cyanoacrylic acid, and PE, according to a third molar ratio of 3:1:1 (acrylic acid:2-cyanoacrylic acid:PE). For the third molar ratio of reactants, a transesterification reaction results in a mixed acrylate-cyanoacrylate compound with one cyanoacrylate group and three acrylate groups, having the following structural formula:

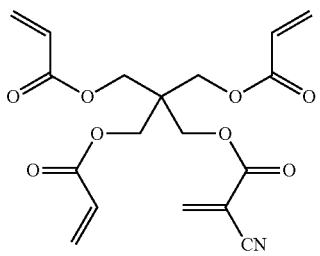 [SMILES: C=CC(=O)OCC(COC(=O)C=C)(COC(=O)C=C)COC(=O)C(=C)C#N]

In a particular embodiment, the third acrylate-cyanoacrylate monomer 106 depicted in FIG. 4C having three acrylate groups and one cyanoacrylate group may be synthesized in a similar manner to that described with respect to FIG. 4A, modified to a molar ratio of 3:1:1 (acrylic acid:2-cyanoacrylic acid:PE).

Thus, FIGS. 4A to 4C illustrate examples of processes for forming an acrylate-cyanoacrylate PE derivative. A mixture of acrylic acid and 2-cyanoacrylic acid is utilized to form the acrylate and cyanoacrylate functionalities. Different reaction stoichiometries result in different levels of cyanoacrylate substitution of the hydroxyl groups of PE.

Figure 5A:
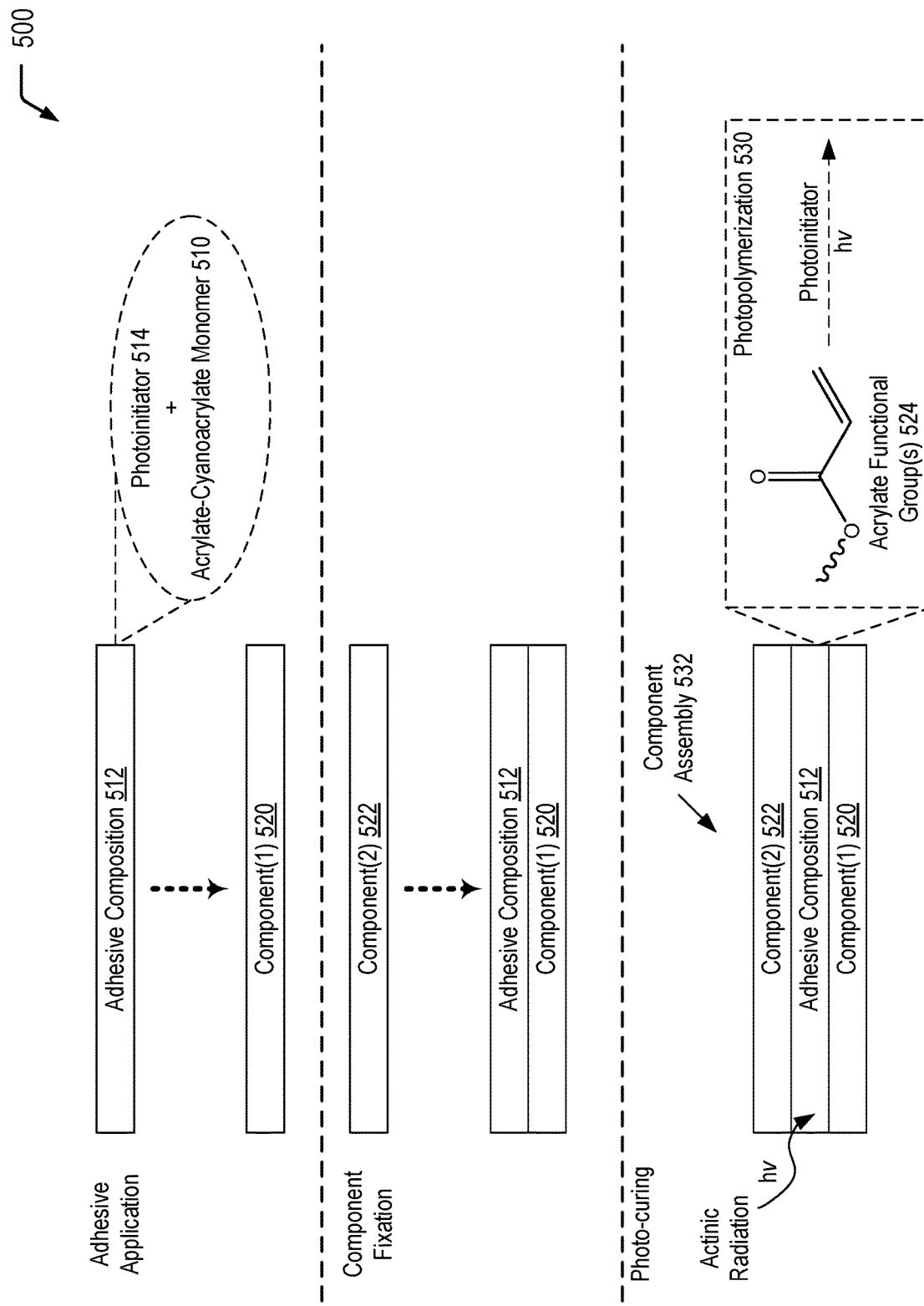
FIGS. 5A and 5B are block diagrams depicting a particular embodiment of a component assembly process using an adhesive composition that includes an acrylate-cyanoacrylate monomer.
Figure 5B:
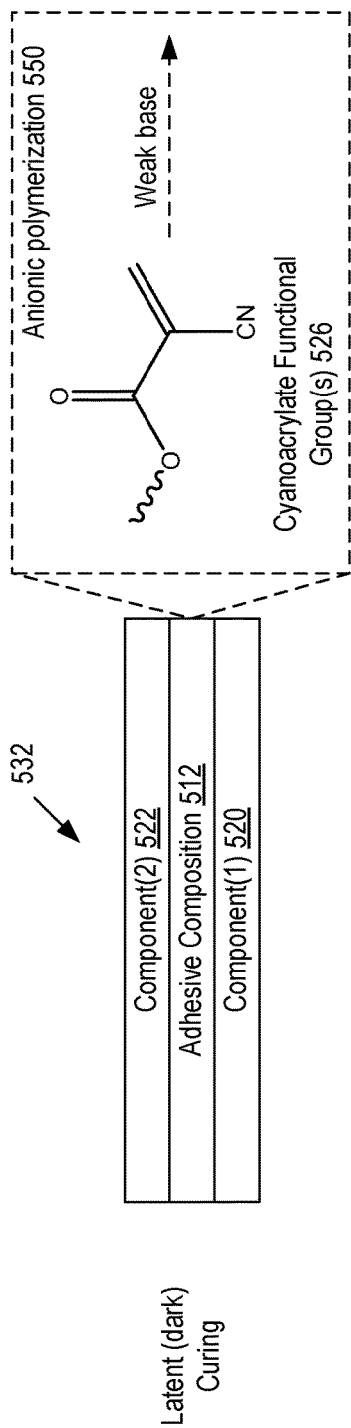

FIGS. 5A and 5B are block diagrams 500, 540 depicting a particular embodiment of a component assembly process utilizing an acrylate-cyanoacrylate monomer 510 (or a mixture of acrylate-cyanoacrylate monomers) of the present disclosure. Thus, the acrylate-cyanoacrylate monomer 510 may correspond to the first acrylate-cyanoacrylate monomer 102, the second acrylate-cyanoacrylate monomer 104, the third acrylate-cyanoacrylate monomer 106, or any combination thereof.

Referring to FIG. 5A, an adhesive composition 512 includes a photoinitiator 514 and the acrylate-cyanoacrylate monomer 510. The top portion of FIG. 5A illustrates that the adhesive composition 512 is applied to a first component 520 during an adhesive application stage of the component assembly process, followed by application of a second component 522 to the adhesive composition 512. The acrylate-cyanoacrylate monomer 510 includes at least one acrylate functional group 524 and at least one cyanoacrylate functional group 526 (see FIG. 5B).

The bottom portion of FIG. 5A illustrates that the acrylate functional group 524 of the acrylate-cyanoacrylate monomer 510 undergoes a photopolymerization reaction 530 to partially cure the adhesive composition 512, rendering the adhesive composition 512 "tacky" for fixation of the second component 522 to the first component 520 to form a component assembly 532. As an illustrative, non-limiting example, the component assembly 532 may include a tape head assembly, with the adhesive composition 512 being applied to a tape module (e.g., the first component 520) for mounting to a fixture (e.g., the second component 522).

FIG. 5B illustrates that the cyanoacrylate functional group 526 of the acrylate-cyanoacrylate monomer 510 undergoes an anionic polymerization reaction 550 in the presence of a weak base (latent dark curing) to fill gaps between the components 520, 522 of the component assembly 532. The adhesive composition 512 may have an increased viscosity compared to a cyanoacrylate adhesive that utilizes a 2-ethylcyanoacrylate monomer, enabling better gap filling between the components 520, 522 of the component assembly 532.

Thus, FIGS. 5A and 5B illustrate an example of a component assembly process that utilizes an adhesive composition including one or more acrylate-cyanoacrylate monomers of the present disclosure. By incorporating both acrylate and cyanoacrylate functionalities, the acrylate-cyanoacrylate monomers enable both a rapid cure and a latent dark cure. Additionally, the adhesive composition may have an increased viscosity compared to a cyanoacrylate adhesive that utilizes a 2-ethylcyanoacrylate monomer, enabling better gap filling between components.

Figure 6:
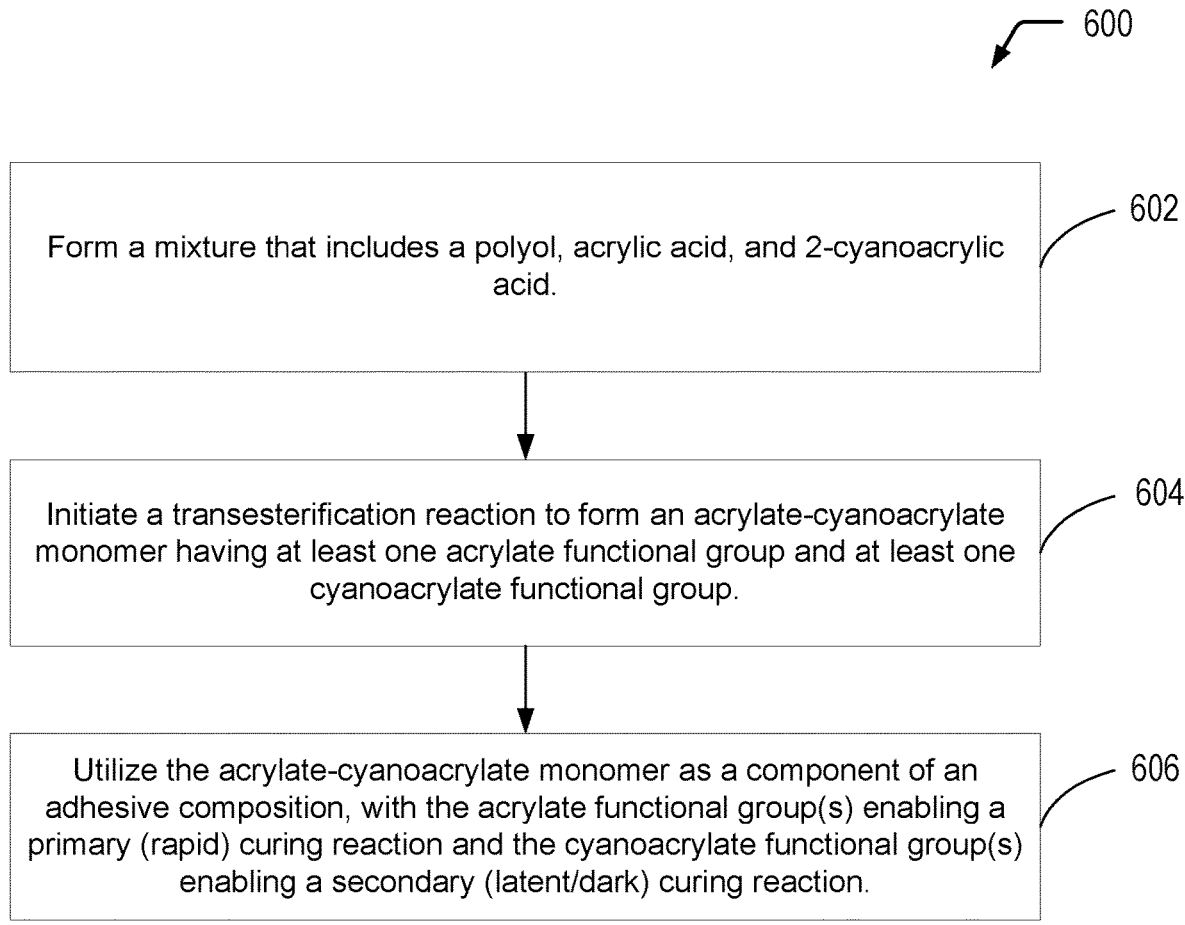
FIG. 6 is a flow diagram illustrating a particular embodiment of a process of forming an acrylate-cyanoacrylate monomer.

FIG. 6 is a flow diagram illustrating an example of a process 600 of forming an acrylate-cyanoacrylate monomer, according to one embodiment.

The process 600 includes forming a mixture that includes a polyol, acrylic acid, and 2-cyanoacrylic acid, at 602. For example, for the first acrylate-cyanoacrylate monomer 102 depicted in FIG. 1, FIGS. 2A and 2B illustrate a mixture in which the polyol corresponds to TMP. As another example, for the second acrylate-cyanoacrylate monomer 104 depicted in FIG. 1, FIGS. 3A to 3C illustrate a mixture in which the polyol corresponds to di-TMP. As yet another example, for the third acrylate-cyanoacrylate monomer 106 depicted in FIG. 1, FIGS. 4A to 4C illustrate a mixture in which the polyol corresponds to PE.

The process 600 includes initiating a transesterification reaction to form an acrylate-cyanoacrylate monomer having, at 604. The acrylate-cyanoacrylate monomer has at least one acrylate functional group and at least one cyanoacrylate functional group.

For example, for the first acrylate-cyanoacrylate monomer 102 depicted in FIG. 1, FIG. 2A illustrates a first embodiment in which the transesterification reaction results in the formation of a first TMP derivative with one acrylate functional group and two cyanoacrylate functional groups (for a first reactant stoichiometry). FIG. 2B illustrates a second embodiment in which the transesterification reaction results in the formation of a second TMP derivative with two acrylate functional groups and one cyanoacrylate functional group (for a second reactant stoichiometry).

As another example, for the second acrylate-cyanoacrylate monomer 104 depicted in FIG. 1, FIG. 3A illustrates a first embodiment in which the transesterification reaction results in the formation of a first di-TMP derivative with one acrylate functional group and three cyanoacrylate functional groups (for a first reactant stoichiometry). FIG. 3B illustrates a second embodiment in which the transesterification reaction results in the formation of a second di-TMP derivative with two acrylate functional groups and two cyanoacrylate functional groups (for a second reactant stoichiometry). FIG. 3C illustrates a third embodiment in which the transesterification reaction results in the formation of a third di-TMP derivative with three acrylate functional groups and one cyanoacrylate functional group (for a third reactant stoichiometry).

As yet another example, for the third acrylate-cyanoacrylate monomer 106 depicted in FIG. 1, FIG. 4A illustrates a first embodiment in which the transesterification reaction results in the formation of a first PE derivative with one acrylate functional group and three cyanoacrylate functional groups (for a first reactant stoichiometry). FIG. 4B illustrates a second embodiment in which the transesterification reaction results in the formation of a second PE derivative with two acrylate functional groups and two cyanoacrylate functional groups (for a second reactant stoichiometry). FIG. 4C illustrates a third embodiment in which the transesterification reaction results in the formation of a third PE derivative with three acrylate functional groups and one cyanoacrylate functional group (for a third reactant stoichiometry).

In the particular embodiment depicted in FIG. 6, the process 600 also includes utilizing the acrylate-cyanoacrylate monomer as a component of an adhesive composition, at 606. The acrylate functional group (or groups) enables a primary curing reaction and the cyanoacrylate functional group (or groups) enables a secondary curing reaction. For example, referring to FIG. 5A, the acrylate-cyanoacrylate monomer 510 may be utilized as a component of the adhesive composition 512. FIG. 5A illustrates that the one or more acrylate functional groups 524 enables photo-curing of the adhesive composition 512 for fixing the first component 520 to the second component 522. FIG. 5B illustrates that the one or more cyanoacrylate functional groups 526 enables latent/dark curing of the adhesive composition 512 for filling gaps between the first component 520 and the second component 522.

Thus, FIG. 6 illustrates an example of a process of forming an acrylate-cyanoacrylate monomer. The acrylate-cyanoacrylate monomer is a multifunctional monomer including both acrylate and cyanoacrylate functionalities. By incorporating both functionalities, the acrylate-cyanoacrylate monomer enables both a rapid cure of an adhesive composition and a latent dark cure of the adhesive composition. Additionally, the adhesive composition may have an increased viscosity compared to a cyanoacrylate adhesive that utilizes a 2-ethylcyanoacrylate monomer, enabling better gap filling between components.

Figure 7:
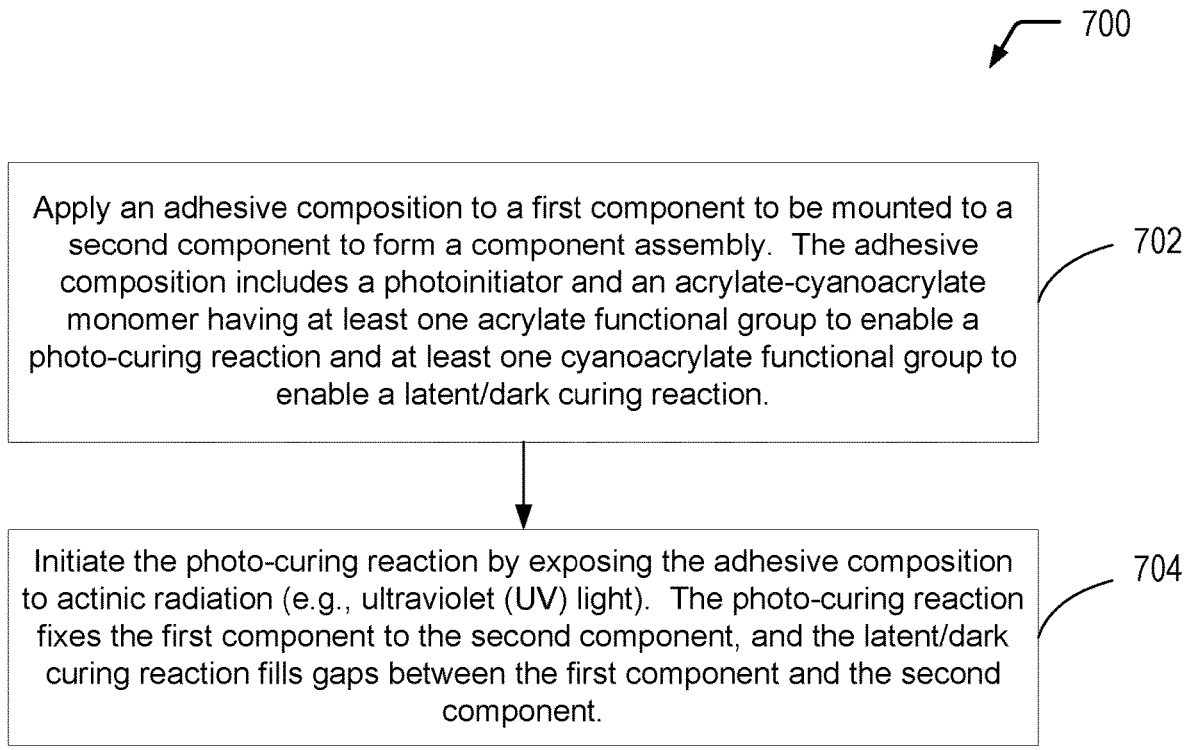
FIG. 7 is a flow diagram illustrating a particular embodiment of a process of utilizing an acrylate-cyanoacrylate monomer as a component of an adhesive composition, with the acrylate functional group(s) enabling photo-curing of the adhesive composition and the cyanoacrylate group(s) enabling latent curing of the adhesive composition.

FIG. 7 is a flow diagram illustrating a particular embodiment of a process 700 of forming a component assembly using an adhesive composition that includes one or more of the acrylate-cyanoacrylate monomers of the present disclosure.

The process 700 includes applying an adhesive composition to a first component to be mounted to a second component to form a component assembly, at 702. The adhesive composition includes a photoinitiator and an acrylate-cyanoacrylate monomer having at least one acrylate functional group and at least one cyanoacrylate functional group. The acrylate functional group (or groups) enables a photo-curing reaction and the cyanoacrylate functional group (or groups) enables a latent/dark curing reaction. For example, referring to FIG. 5A, the adhesive composition 512 including the acrylate-cyanoacrylate monomer 510 may be applied to the first component 520 to be mounted to the second component 522 to form the component assembly 532. FIG. 5A illustrates that the acrylate functional group (or groups) 524 enables photo-curing of the adhesive composition 512, and FIG. 5B illustrates that the cyanoacrylate functional group (or groups) 526 enables latent/dark curing of the adhesive composition 512.

The process 700 includes initiating the photo-curing reaction by exposing the adhesive composition to actinic radiation (e.g., UV light), at 704. The photo-curing reaction fixes the first component to the second component, while the latent curing reaction filling gaps between the components. For example, referring to FIG. 5A, exposing the adhesive composition 512 to actinic radiation initiates the photopolymerization 530, for fixing the first component 520 to the second component 522. FIG. 5B illustrates that the anionic polymerization 550 fills gaps between the first component 520 and the second component 522.

Thus, FIG. 7 illustrates an example of a process of utilizing the acrylate-cyanoacrylate monomers of the present disclosure as a component of an adhesive composition. Acrylate groups enable rapid photo-curing for fixing components together, and cyanoacrylate groups enable latent curing for filling gaps between components. Compared to a cyanoacrylate adhesive that utilizes a 2-ethylcyanoacrylate monomer, the adhesive composition may have an increased viscosity for improved gap filling.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming an acrylate-cyanoacrylate monomer, the process comprising:
    forming a mixture that includes a polyol, acrylic acid, and 2-cyanoacrylic acid; and
    initiating a transesterification reaction to form an acrylate-cyanoacrylate monomer having at least one acrylate functional group and at least one cyanoacrylate functional group.

2. The process of claim 1, wherein the polyol includes trimethylolpropane.

3. The process of claim 1, wherein the polyol includes di(trimethylolpropane).

4. The process of claim 1, wherein the polyol includes pentaerythritol.

\* \* \* \* \*